(12) United States Patent
Blum

(10) Patent No.: US 8,945,378 B2
(45) Date of Patent: Feb. 3, 2015

(54) APPARATUS FOR CLEANING WASTEWATER

(76) Inventor: Holger Blum, Teufen (CH)

(*) Notice: Subject to any disclaimer, the term of this patent is extended or adjusted under 35 U.S.C. 154(b) by 535 days.

(21) Appl. No.: 13/378,998

(22) PCT Filed: Jun. 16, 2010

(86) PCT No.: PCT/EP2010/003606
§ 371 (c)(1),
(2), (4) Date: Mar. 5, 2012

(87) PCT Pub. No.: WO2010/145810
PCT Pub. Date: Dec. 23, 2010

(65) Prior Publication Data
US 2012/0152831 A1 Jun. 21, 2012

(30) Foreign Application Priority Data
Jun. 16, 2009 (DE) .......................... 10 2009 025 082

(51) Int. Cl.
C02F 3/00 (2006.01)
C02F 3/08 (2006.01)
C02F 3/20 (2006.01)

(52) U.S. Cl.
CPC . C02F 3/085 (2013.01); C02F 3/20 (2013.01); C02F 2305/06 (2013.01)
USPC ........... 210/150; 210/151; 210/175; 210/206; 210/209; 210/220

(58) Field of Classification Search
USPC ......... 210/615–618, 749, 150–151, 175, 206, 210/209, 220
See application file for complete search history.

(56) References Cited

U.S. PATENT DOCUMENTS 3,607,737 A * 9/1971 Garner .......................... 210/613
4,618,418 A 10/1986 Heijnen et al.
(Continued)

FOREIGN PATENT DOCUMENTS

CN 101327993 A 12/2008
WO WO 95/17351 A1 6/1995

OTHER PUBLICATIONS

Examination Report for European Patent Application No. 10734028.3 dated Jan. 7, 2014.
(Continued)

Primary Examiner — Chester Barry
(74) Attorney, Agent, or Firm — Nixon Peabody LLP; Joseph Bach, Esq.

(57) ABSTRACT

A method for cleaning waste water is provided whereby the waste water is led through a throughput tank having filler materials to which aerobic microorganisms are adhered and wherein the throughput tank is ventilated with an oxygen-containing gas. As filler materials, materials are used which have a specific weight approximately equal to the specific weight of the waste water whereby the filler materials are suspended in the waste water. The inflow of the waste water into the throughput tank and the ventilation of the throughput tank is affected from bottom of the throughput tank and in such a gas amount that the waste water and the filler bodies suspended therein are mixed and the microorganisms on the filler bodies are supplied with sufficient oxygen. The device has a throughput tank with a tank bottom, a tank wall, wherein the inflow connecting pipe and the ventilation arrangement are arranged on the tank bottom and the outflow connecting pipe is arranged at the upper area of the throughput tank.

13 Claims, 3 Drawing Sheets

(56) References Cited

U.S. PATENT DOCUMENTS

| | | | | |
|---|---|---|---|---|
| 4,836,606 | A * | 6/1989 | Werner | 297/362 |
| 4,931,442 | A | 6/1990 | Blum | |
| 4,948,493 | A * | 8/1990 | Wilson | 208/179 |
| 4,983,298 | A | 1/1991 | Fuchs et al. | |
| 5,055,186 | A | 10/1991 | Van Toever | |
| 5,228,995 | A * | 7/1993 | Stover | 210/603 |
| 5,624,564 | A * | 4/1997 | Blum | 210/609 |
| 6,007,712 | A * | 12/1999 | Tanaka et al. | 210/151 |
| 6,328,892 | B1 * | 12/2001 | Jones | 210/605 |
| 6,682,653 | B2 * | 1/2004 | Chuang et al. | 210/616 |
| 2005/0178725 | A1 * | 8/2005 | Frisch | 210/616 |
| 2007/0102354 | A1 * | 5/2007 | Flournoy et al. | 210/614 |

OTHER PUBLICATIONS

Office Action for Chinese Patent Application No. 201080032263.0 dated Jan. 17, 2014.
International Search Report for PCT/EP2010/003606 dated Oct. 22, 2010.

* cited by examiner

APPARATUS FOR CLEANING WASTEWATER

CROSS-REFERENCE TO RELATED APPLICATIONS

This application is a National Phase of International Application No. PCT/EP2010/003606, which was filed on Jun. 16, 2010, and which claims priority to and the benefit of German Patent Application No. 102009025082.4, filed on Jun. 16, 2009, and the disclosures of which are hereby incorporated herein by reference in their entireties.

The invention relates to a method and a device for cleaning waste water using aerobic microorganisms.

There are already known numerous methods and devices for cleaning waste water using aerobic microorganisms. However, as a rule, the known devices have the deficiencies that an intricately constructed apparatus and a corresponding constructional effort is required in order to achieve a satisfactory throughput through the device and, thereby, an economic purification of the waste water.

The invention is based on the object to provide a method and a device by which a high throughput is achieved with low constructional effort, whereby the relationship of constructional bulk and throughput is to be optimized in the device of the invention.

For this purpose, a method for cleaning waste waters is provided by the invention wherein the waste water is fed through a throughput tank containing filler bodies having aerobic microorganisms adhered thereto, and wherein the throughput tank is ventilated by an oxygen-containing gas, characterized in that, as filler material materials are chosen which have a specific weight approximately equal to the specific weight of the waste water whereby the filler bodies are suspended in the waste water, and that the inflow of the waste water into the throughput tank and the ventilation of the throughput tank is effected from the bottom of the throughput tank and in such a gas amount that the waste water and the filler bodies suspended therein, are mixed and the microorganisms on the filler bodies are sufficiently supplied with oxygen. In that the filler bodies are kept in the suspended state in the waste water, at the one hand, the feeding of the microorganisms with oxygen is promoted and, on the other hand, a uniform processing of the waste water is carried out by means of the microorganisms because of the uniform distribution of the filler bodies in the waste water. Because of the fact that the flow of the waste water is uniformly turbulent in all areas of the throughput tank, there are no dead zones in the flow in the throughput tank and in the processing of the waste water by means of the microorganisms because there are no disturbances of the fluid flow which would cause such dead zones. Since there are no dead zones in the fluid flow in the throughput tank and since the processing of the waste water is promoted by the microorganisms by means of the undisturbed fluid flow, the required dwelling time of the waste water in the throughput tank can be shortened to approximately one half as compared to conventional systems in which, as a rule, disturbances of the fluid flow are present.

According to an advantageous embodiment of the invention, the method is characterized in that, as ventilation gas for ventilating the waste water in the throughput tank, pressurized air is used whereby, in an advantageous way, no separate source for a oxygen-containing gas has to be provided.

According to a further advantageous embodiment of the invention, the method is characterizes in that the pressure of the ventilation gas is determined such that the gas stream is maintained against the hydraulic pressure in the throughput tank and the pressure loss at the ventilation nozzles.

In other words, the pressure of the ventilation gas can be optimized with respect to the constructional height of the throughput tank or the hydraulic pressure thereof, respectively.

According to a further advantageous embodiment of the invention, the method is characterized in that, as a filler material, bodies out of polyethylene or polypropylene are chosen whereby this material has proven to be economic and particularly effective.

According to a further advantageous embodiment of the invention, the method is characterized in that the waste water is kept at 20 to 30° C., preferably 22 to 28° C., in the throughput tank, where the activity of the microorganisms is particularly effective at these temperatures. In particular, temperature variations in the environment can be avoided which can adversely affect the process of microorganisms.

According to a further advantageous embodiment of the invention, the method is characterized in that an aqueous, diluted, stabilized folic acid solution is dosed to the waste water in the throughput tank. The addition of folic acid promotes the conversion of the harmful substances by the microorganisms and has also the consequence that the required dwelling time of the waste water in the throughput tank is again almost cut in half as compared to the device without addition of folic acid. Finally, also less surplus sludge is generated in the device.

According to a further advantageous embodiment of the invention, the method is characterized in that the aqueous, diluted, stabilized folic acid solution is dosed into the feeding pipe for the waste water to the throughput tank. Thereby, it is achieved, in an advantageous way, that the mixing of the waste water flow which is fed to the device and the diluted folic acid solution is already carried out before the mixture enters into the throughput tank. Thereby, it is also ensured that the folic acid is uniformly distributed in the complete volume of the throughput tank.

According to a further advantageous embodiment of the invention, the method is characterized in that the dosage of the aqueous, diluted, stabilized folic acid solution is chosen such that about 0,5 to 1 liter folic acid is dosed to about 1.000.000 liter waste water. Already such a low amount of folic acid is sufficient in order to achieve the above mentioned, advantageous effect of the promotion of the activities of the microorganisms and prevention of surplus sludge.

The above-mentioned object is, furthermore, achieved by a device for cleaning waste water having a throughput tank with a tank bottom, a tank wall and an inflow connecting pipe and a outflow connecting pipe wherein, in the throughput tank, filler bodies are present to which aerobic microorganisms are adhered, and wherein, at the throughput tank, a ventilation system for ventilating the waste water in the throughput tank with an oxygen-containing gas which is characterized in that the inflow connecting pipe and the ventilation system are arranged at the tank bottom and the outflow connecting pipe is arranged at the upper area of the throughput tank that the filler bodies have a specific weight approximately equal to the specific weight of the waste water, wherein the filler bodies are suspended in the waste water, and that the ventilation of the throughput tank from the bottom is designed to be such an amount of gas that the waste water and the filler bodies suspended therein, are mixed, and that the microorganisms on the filler bodies are fed with sufficient oxygen. By means of this simple structure, it is achieved, in an advantageous way, that a large throughput amount can be achieved with a low constructional effort and with a low construction height by means of the inventive device.

According to an advantageous embodiment of the invention, the device is characterized in that the ventilation system at the tank bottom of the throughput tank comprises at least one distribution tube integrated into the tank bottom and having nozzle openings on its sides in contact with the waste water, and a stub for the gas supply. By means of the distribution tube integrated in the tank bottom and having nozzle openings, an almost two-dimensional distribution of the gas supply to the throughput tank without disturbances of the fluid flow is achieved.

According to a further advantageous embodiment of the invention, the device is characterized in that at least two distributor tubes integrated into the tank bottom are provided, whereby the two-dimensional effect of the distributor tubes with respect to the gas supply is optimized.

According to a further advantageous embodiment of the invention, the device is characterized in that the distributor tubes are rectangular, and that the two side surfaces of the distributor tubes are arranged in an angle of 45° with respect to the tank bottom so that two sides of the distributor tubes 6 are in contact with the waste water to be cleaned. By means of this arrangement of the distributor tubes as rectangular tubes, at the one hand, a stabilization of the tank bottom is achieved and, on the other hand, a good mixing effect of the gas bubbles with the waste water in the throughput tank is achieved by the oblique arrangement of the side surfaces of the distributor tubes.

According to a further advantageous embodiment of the invention, the device is characterized in that the nozzle openings in the distributor tubes have the shape of holes or slits which means that the nozzle openings do not necessitate a special shape in order to be used as nozzles for the supply of oxygen-containing gas to the throughput tank.

According to a further advantageous embodiment of the invention, the device is characterized in that the nozzle openings comprise round bores/slits having a maximum diameter of about 3 to 6 millimeter. With respect to the pressure of the supplied gases and the hydraulic pressure in the throughput tank, such dimensions of the nozzle openings have proven of particular value.

According to a further advantageous embodiment of the invention, the device is characterized in that the nozzle openings are distributed across the hole length of the distributor tubes which has an advantageous effect on the distribution of the gas supply to the throughput tank.

According to a further advantageous embodiment of the invention, the device is characterized in that drainage slits for the cleaned waste water are provided at the upper circumference of the throughput tank whereby the drainage slits have a cross section which is smaller than the smallest diameter of the filler bodies. Thereby, an undisturbed drainage of the cleaned waste water is made possible so that, also here, there is no disturbance of the fluid flow. Furthermore, it is achieved, in an advantageous way, that the filler bodies remain in the throughput tank without particular retaining measures being required.

According to a further advantageous embodiment of the invention, the device is characterized in that an overflow weir is arranged on the throughput tank at its upper end below the drainage slits, and that the overflow weir comprises the outflow connecting pipe for draining the cleaned waste water whereby the cleaned water can be drained in a simple way.

According to a further advantageous embodiment of the invention, the device is characterized in that an overflow weir surrounds the throughput tank at its upper end like a collar whereby the cleaned waste water may be led out of the device on the shortest possible way.

According to a further advantageous embodiment of the invention, the device is characterized in that a tank cover having a larger diameter than the overflow weir, is arranged spaced from the overflow weir, whereby the upper part of the throughput tank and also the overflow weir are save guarded against contamination.

According to a further advantageous embodiment of the invention, the device is characterized in that the tank cover is arranged in such a distance from the overflow weir that the discharge gas stream OG out of the throughput tank can exit unhindered into the environment.

According to a further advantageous embodiment of the invention, the device is characterized in that a heating arrangement is arranged on the outer surface of the throughput tank whereby temperature variations of the environment may be compensated in a simple way.

According to a further advantageous embodiment of the invention, the device is characterized in that the heating arrangement comprises a heat exchanger having at least an input stub and at least an output stub for a liquid heat transfer medium.

A heat exchanger with a liquid heat transfer medium is an advantageous solution of the problem in these circumstances as to how the throughput tank may be kept at the desired temperature.

According to a further advantageous embodiment of the invention, the device is characterized in that an insulating means out of a low heat conducting insulating material is arranged on the outside of the throughput tank on top of the heating arrangement whereby the device is protected against heat losses in case a corresponding heating of the waste water in the throughput tank is required.

According to a further advantageous embodiment of the invention, the device is characterized by a blower which feeds oxygen-containing gas through a gas supply line and through the stubs for the gas supply into the throughput tank. Such a blower is the most simple and, therefore, advantageous solution in order to supply the throughput tank with oxygen-containing gas.

According to a further advantageous embodiment of the invention, the device is characterized by a folate tank which is to be filled with aqueous, diluted, stabilized folic acid solution and which is connected with the supply line for the waste water to the throughput tank. The use of aqueous, diluted, stabilized folic acid for such waste water has the advantage that the affectivity of the conversion of the harmful substances by means of the microorganisms is improved and formation of surplus sludge is effectively reduced.

According to a further advantageous embodiment of the invention, the device is characterized in that, in between the folate tank and a dosage stub inserted in the feeding line for the waste water to be cleaned, a folate line, a dosage pump, a check valve and a control valve are provided. Thereby, it is possible in a simple way to dose sufficient aqueous, diluted, stabilized folic acid into the waste water stream.

Embodiments of the invention are now described with respect to the enclosed drawings in which.

Figure 1:
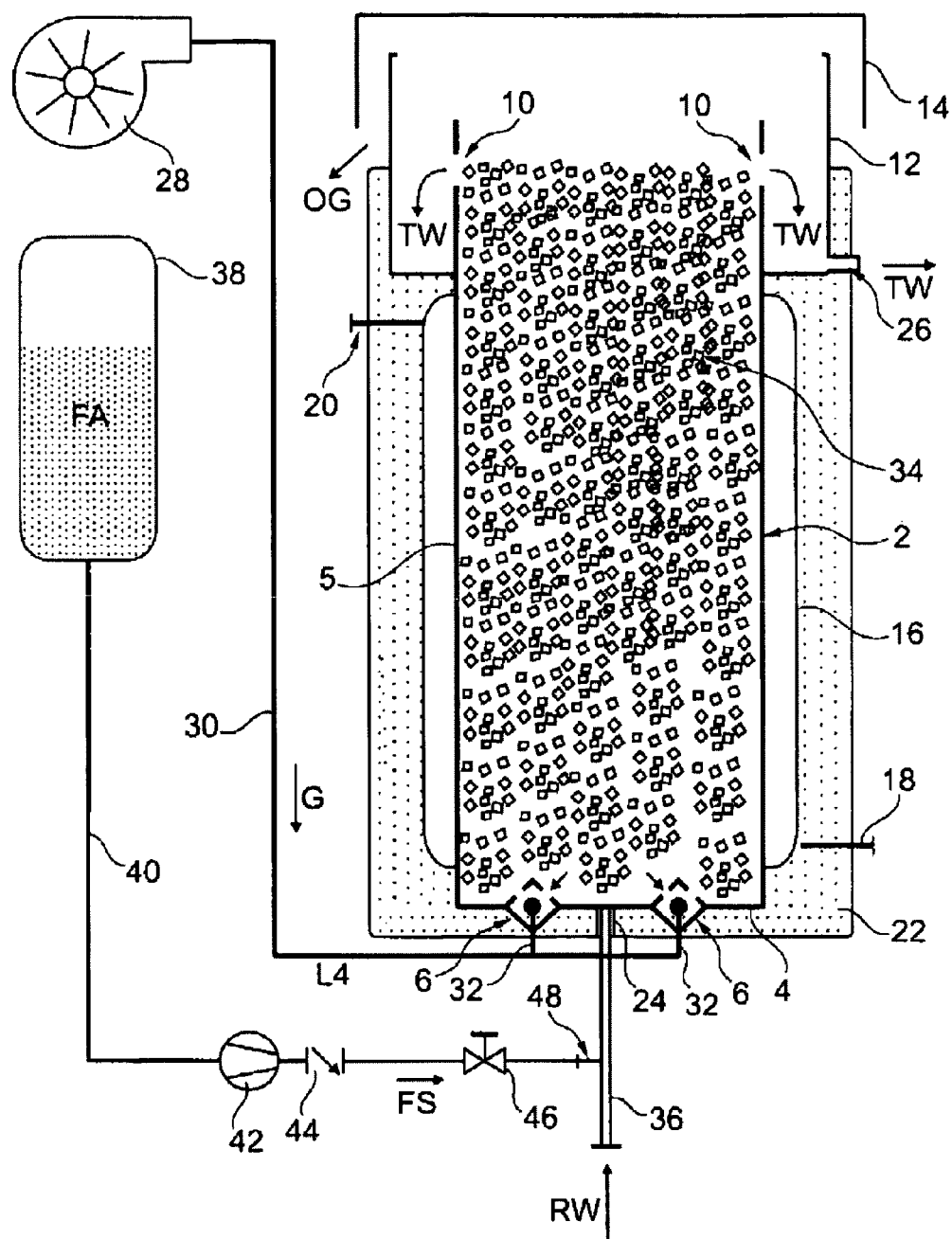
FIG. 1 shows a schematic section through a device for cleaning waste water.

According to FIG. 1, the device for cleaning waste water comprises a throughput tank 2 having a planar tank bottom 4 and a tank wall 5, through which tank the waste water to be cleaned is led. In operation, the throughput tank 2 is filled with the waste water to be cleaned and with freely movable suspended filler bodies 34 populated with microorganisms.

Rectangular distribution tubes 6 are welded into the tank bottom 4 so that at least one side of the distributor tubes 6 is in contact with the waste water to be cleaned. Preferably, the distributor tubes 6 are, as seen in FIG. 1, welded into the tank bottom 4 in such a way that two of its side surfaces are in an angle of 45° to the planar tank bottom 4 so that two sides of the distribution tubes 6 are in direct contact with the waste water to be cleaned. In this 45° position, the distributor tubes also act at maximum as mechanical reinforcement of the bottom, and, furthermore, the 45° position of the nozzle surfaces in contact with the water causes an optimal separation and distribution of the gas bubbles exiting the ventilation nozzles 8 into the water. Nozzle openings 8 are provided at the sides of the distribution tubes 6 which are in contact with the waste water to be cleaned. The nozzle openings have the shape of holes or slits, preferably are round bores having a diameter of approximately 3 to 6 millimeter, and they are distributed across the hole length of the distribution tubes 6.

The distribution tubes 6 are provided with inspection glasses 50 at their face sides. The distribution tubes 6 comprise, on at least one end of the tube, a stub 32 for the supply of oxygen-containing gas, for example air, to the distributor tubes 6. The tank bottom 6 comprises at least one inflow connecting pipe 24 for the waste water to be cleaned.

On the upper circumference of the throughput tank 2, drainage slits 10 for the cleaned waste water are provided. The drainage slits 10 have a cross section which is smaller than the smallest diameter of the suspended filler bodies 34. An overflow weir 14 is also provided at the upper circumference of the throughput tank 2 which weir surrounds the throughput tank 2 at the upper end below the drainage slits 10 like a collar. The overflow weir 12 comprises at least one outflow connecting pipe 26 for draining the cleaned waste water. The overflow weir 12 is protected against intrusion of foreign materials by means of a tank cover 14 which has a larger diameter than the overflow weir 12 and is arranged in such a distance from the upper edge of the overflow weir 12 that the drainage gas stream OG out of the throughput tank 2 can exit unhindered into the environment.

On the outer surface of the throughput tank 2, a heating arrangement 16 is provided which is designed considering the volume of the throughput tank 2 such that the liquid contained in the throughput tank 2 may be heated up to 20 to 30° C., preferably 22 to 28° C., also in case the surrounding temperature is lower. In the preferred embodiment, the heating arrangement comprises heat exchangers 16 on the outer surface of the throughput tank having at least one input stub 18 and at least one outflow connecting pipe 20 for a liquid heat exchange medium, for example heated water. The heating arrangement is provided with an insulation 22 out of poorly heat conducting insulating material which is applied from the outside to the throughput tank 2 around the heat exchanger 16 and which surrounds the device to a large extend and protects it against heat loss.

For supplying the throughput tank with an oxygen-containing gas, a blower 28 is provided which feeds the gas through a gas feeding line 30 and through stubs 32 for the gas supply into the throughput tank 2 filled with movable filler bodies 34 suspended in the water to be cleaned. In operation, the aerobic microorganisms are adhered to the filler bodies 34 and form a layer on the upper surface of the filler bodies 34. Therefore, the filler bodies 34 are provided with a surface as large as possible.

Furthermore, the device comprises a folate tank 38 which is filled with aqueous, diluted, stabilized folic acid solution (folate) FA. A folate line 40, a dosage pump 42, a check valve 44 and a control valve 46 are provided, in this sequence, in between the folate tank 38 and the dosage stub 48 inserted into the inflow line 36 for the waste water to be cleaned.

Figure 2:
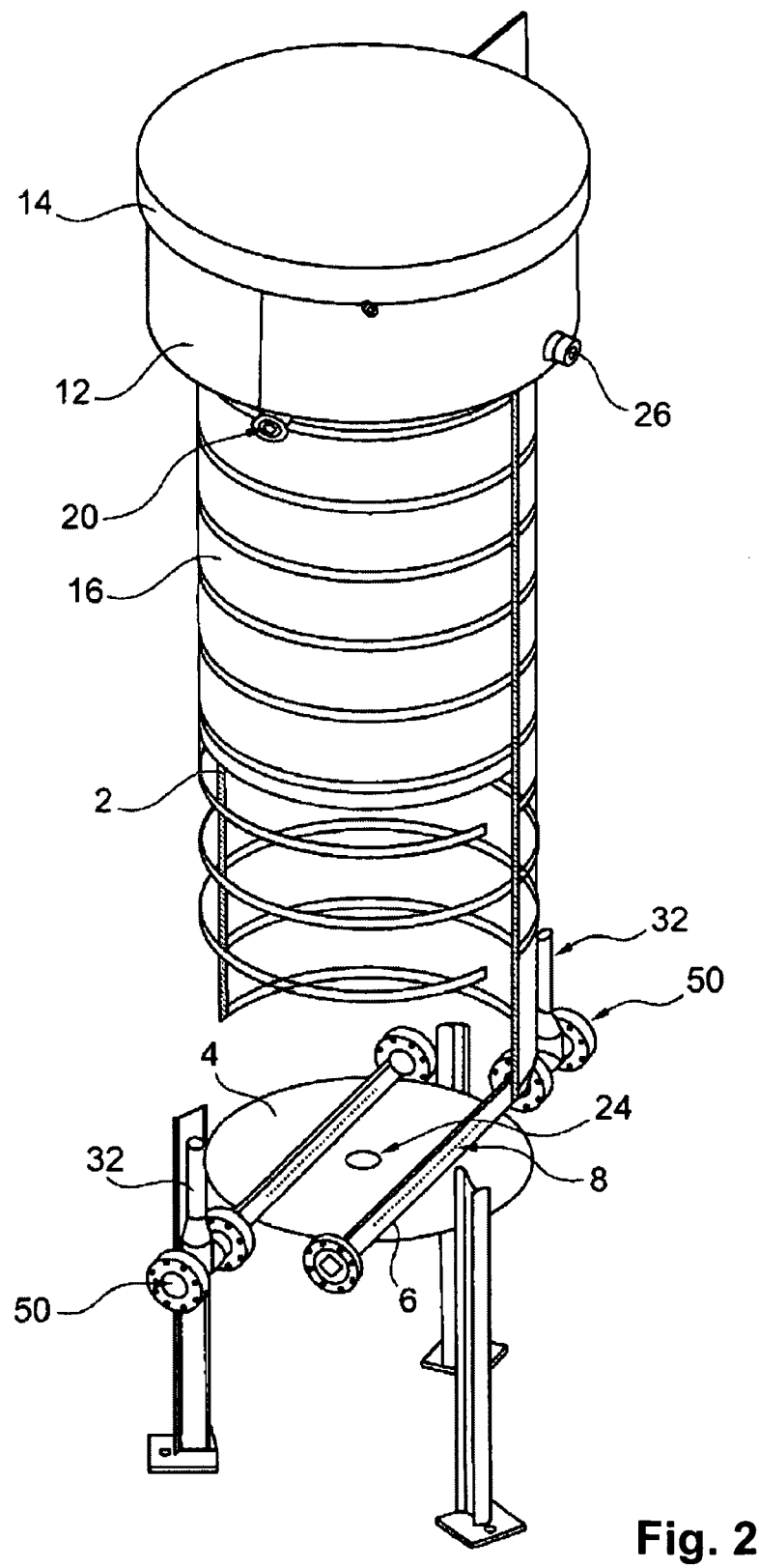
FIG. 2 shows a perspective partial view of the device according to FIG. 1 with a partially cut away tank wall of a throughput tank.

FIG. 2 shows a perspective partial view of the device according to claim 1, wherein the tank wall of a throughput tank 2 is partly cut away at the bottom. Thereby, a view on the planar tank bottom 4 and the distributor tubes 6 inserted into the tank bottom 4 as well as the rows of openings of the ventilation nozzles 8 in the distribution pipes 6 is shown.

Figure 3:
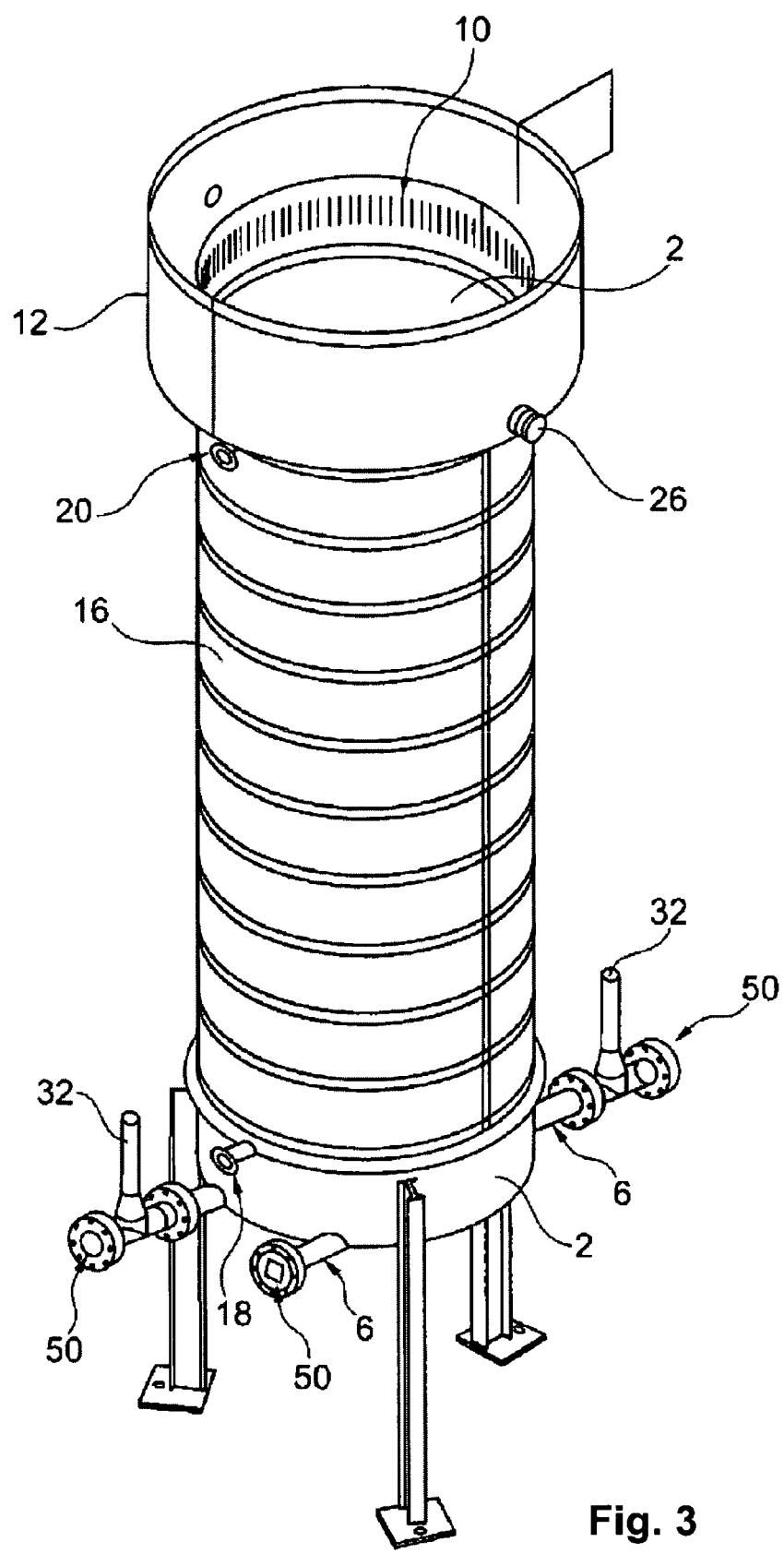
FIG. 3 shows a perspective partial view of the device according to claim 1 with removed cover.

FIG. 3 shows a perspective partial view of the device according to FIG. 1 wherein the cover 14 of the throughput tank 2 is removed. Thereby, the drainage slits 10 in the upper part of the throughput tank 2 can be seen as well as the heat exchanger 16 together with the heat transfer medium filling stub 18 and the heat exchange medium stub 20. Furthermore, the overflow weir 12 and the outflow connecting pipes 26, the viewing glasses 50 and the stub 32 for the gas supply at the end of the distributor tubes 6 are shown.

As can be seen from FIG. 1, in operation of the device, the fluid flow (volume/unit time) of the row water RW blows through the inflow line 36 to the seeding position 48 and is mixed there with the fluid flow FS of the diluted, aqueous folic acid solution. The raw water mixed with the stabilized folic acid in this way, enters into the throughput tank 2 through the inflow connecting pipe 24 from below. The preferably round throughput tank 2 contains the freely movable, suspended filler bodies 34. The filler bodies 34 consist out of plastics, preferably polyethylene or polypropylene, and have a density approximately equal to that of the waste water such that they are suspended in the waste water. The filler bodies 34 preferably have the shape of tube sections having ribs where the ribs are applied on the tube sections in an axial or radial direction. Preferably, the filler bodies 34 have a tube diameter of 1 to 2 centimeters and comprise an inner surface of about 300 to 800 square meters per cubic meter.

On the surface of the filler bodies 34, aerobic microorganisms are settling which affect the purification of the waste water through their metabolism. Besides the raw water stream RW and the flow stream of the diluted, aqueous, stabilized folic acid FS, also the air stream G enters the ventilation nozzles 8 in the throughput tank 2 from below.

The gas stream G supplied to the distribution tubes 6 and the ventilation nozzles 8, respectively, is divided up by means of the plurality of ventilation nozzles 8 into gas bubbles which are ascending upwards in the throughput tank 2, deliver the oxygen to the water and thoroughly mix the contents together with the suspended filler bodies 34.

The blower 28 connected to the gas supply line 30 which blower takes in air from the surroundings and feeds it in a compressed state into the gas supply line 30, provides that the gas stream G is maintained against the hydraulic pressure in the throughput tank 2 and the pressure loss at the ventilation nozzles 8.

In order to carry out the biological cleaning effect of the device of the invention independently from the seasons and the weather conditions, the purification device of the invention comprises a possibility to add heat to the cold raw water stream RW. This supply of heat is affected by the heat exchanger 16 so which a liquid heat exchanger medium, for example hot water, which is pumped through the heat carrier supply stub 18 into the heat exchanger 16 and through the heat exchanger output stub 20 back to the heat source.

By means of the dosage pump 42, the volume fluid flow FS of the diluted, aqueous, stabilized folic acid solution (available under DOSFOLATE®) is fed through the check valve 44 and the control valve 46 from the folate tank 38 to the seeding position 48. The pump power of the dosage pump, i.e. the volume stream FS is determined depending on the volume stream of the raw water, wherein very small amounts, for example 0,5 to 1 liter folic acid on 1.000.000 liter water, is sufficient. Since the dosage arrangement for diluted, aqueous, stabilized folic acid FA is integrated into the device of the invention this allows the operation of the device of the invention with elevated biological cleaning effect per cubic meter throughput through the throughput tank 2 wherein almost no biological surplus sludge is incurred.

The raw water biologically cleaned by means of the microorganisms populating the suspended filler bodies 34, exits the throughput tank 2 at its upper part through the drainage slits 10 into the overflow weir 12 and exits the device of the invention as cleaned water stream TW through the outflow connecting pipe 26.

LIST OF REFERENCE SIGNS 2 flow-through tank
4 tank bottom
5 tank wall
6 distribution tubes
8 ventilation nozzle
10 drainage slits
12 overflow weir
14 tank cover
16 heat exchanger
18 heat transfer medium inflow connecting pipe
20 heat transfer medium output stub
22 isolation
24 inflow connecting pipe
26 outflow connecting pipe
28 blower
30 gas feed line
32 stub for gas supply
34 filler body
36 feeding line
38 folate tank
40 folate line
42 dosage pump
44 check valve
46 control valve
48 dosage stub
50 looking glass
FA folate solution
FS folate stream
G gas stream
OG drainage gas stream
RW raw water stream
TW clean water stream

The invention claimed is:

1. Device for cleaning waste water, comprising:
a throughput tank with a tank bottom, a tank wall, an inflow connecting pipe and an outflow connecting pipe wherein, in the throughput tank, filler bodies are present to which aerobic microorganisms are adhered, and wherein,
at the throughput tank, a ventilation system for ventilating the waste water in the throughput tank with an oxygen-containing gas, characterized in that the inflow connecting pipe and the ventilation system are arranged at the tank bottom and the outflow connecting pipe is arranged at the upper area of the throughput tank, that the filler bodies have a specific weight approximately equal to the specific weight of the waste water, wherein the filler bodies are suspended in the waste water,
wherein the ventilation of the throughput tank from the bottom is designed to be such an amount of gas that the waste water and the filler bodies suspended therein, are mixed and that the microorganisms on the filler bodies are fed with sufficient oxygen; and,
wherein the ventilation system at the tank bottom of the throughput tank comprises at least one distribution tube integrated into the tank bottom and having nozzle openings on its sides in contact with the waste water, and having a stub for the gas supply.

2. Device according to claim 1, wherein the distributor tubes are rectangular, and that the two side surfaces of the distributor tubes are arranged in an angle of 45° with respect to the tank bottom so that two sides of the distributor tubes are in contact with the waste water to be cleaned.

3. Device according to claim 1, wherein the nozzle openings in the distributor tubes have the shape of holes or slits.

4. Device according to claim 1, wherein the nozzle openings comprise round bores or slits having a maximum diameter of about 3 to 6 millimeter.

5. Device according to claim 1, wherein drainage slits for the cleaned waste water are provided at the upper circumference of the throughput tank whereby the drainage slits have a cross section which is smaller than the smallest diameter of the filler bodies.

6. Device according to claim 1, wherein an overflow weir is arranged on the throughput tank at its upper end below the drainage slits, and that the overflow weir comprises the outflow connecting pipe for draining the cleaned waste water.

7. Device according to claim 1, wherein a tank cover which has a larger diameter than the overflow weir, is arranged spaced from the overflow weir.

8. Device according to claim 7, wherein the tank cover is arranged in such a distance from the overflow weir that the discharge gas stream out of the throughput tank can exit unhindered into the environment.

9. Device according to claim 1, wherein a heating arrangement is arranged on the outer surface of the throughput tank.

10. Device according to claim 9, wherein the heating arrangement comprises a heat exchanger having at least an input stub and at least an output stub for a liquid heat transfer medium.

11. Device according to claim 1, wherein an insulating means out of a low heat conducting insulating material is arranged on the outside of the throughput tank on top of the heating arrangement.

12. Device according to claim 1, wherein by a blower which feeds oxygen containing gas through a gas supply line and through the stubs for the gas supply into the throughput tank.

13. Device according to claim 1, comprising a folate tank which is to be filled with aqueous diluted, stabilized folic acid solution and which is connected with the supply line for the waste water to the throughput tank.

* * * * *